Figure 1:
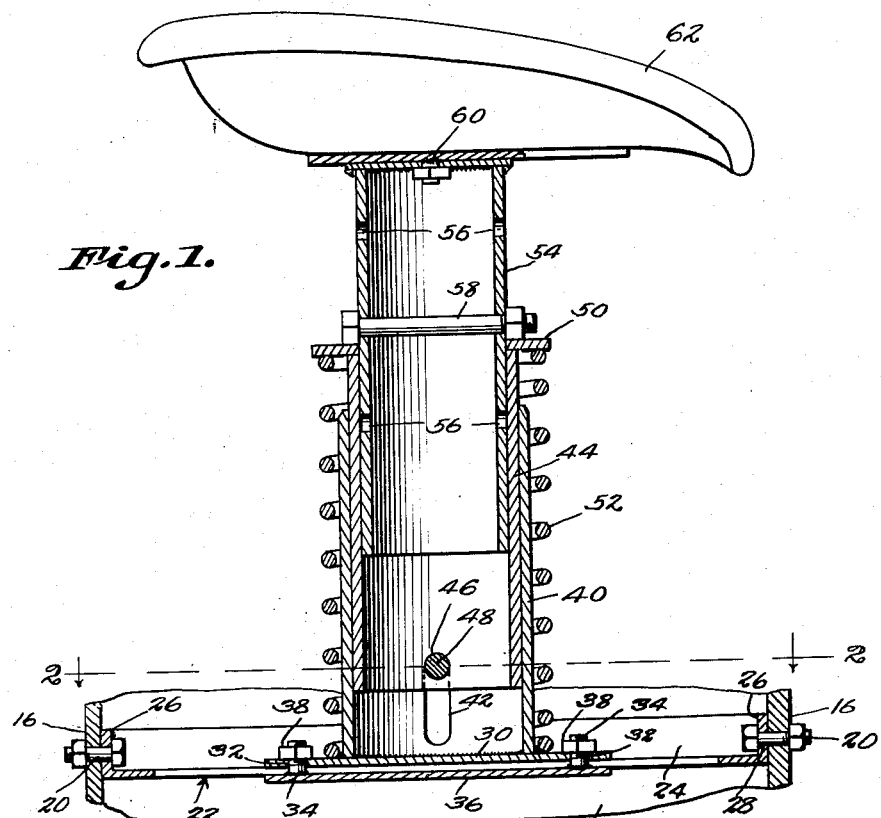

March 23, 1954  W. P. JONES  2,672,915
SPRING SUPPORTED PEDESTAL TRACTOR SEAT
Filed March 24, 1952  2 Sheets-Sheet 1

W. P. Jones
INVENTOR,
BY C.A. Snow & Co.
ATTORNEYS.

March 23, 1954 W. P. JONES 2,672,915
SPRING SUPPORTED PEDESTAL TRACTOR SEAT
Filed March 24, 1952 2 Sheets-Sheet 2
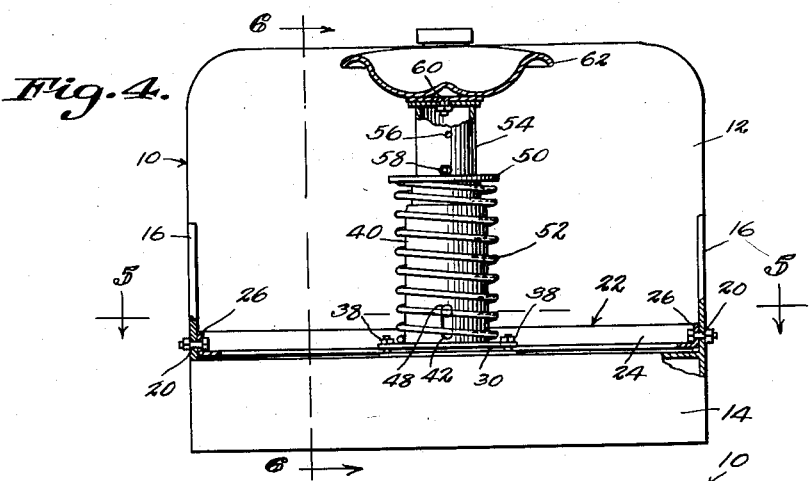
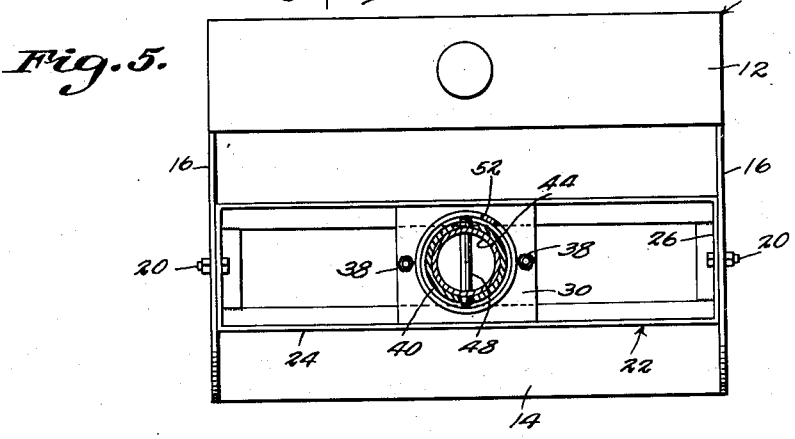
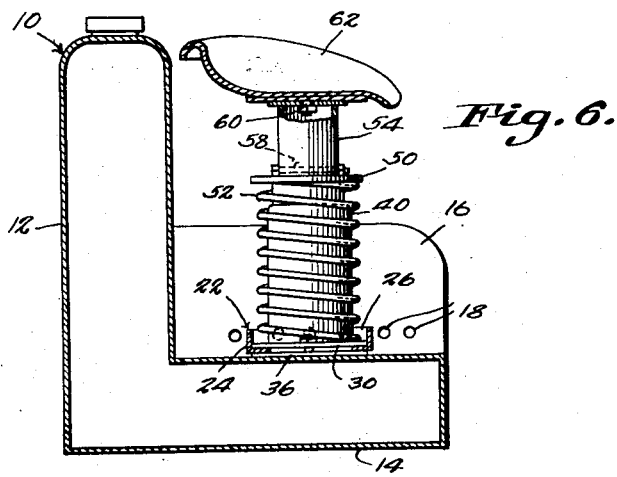
W. P. Jones
INVENTOR,
BY
ATTORNEYS.

Patented Mar. 23, 1954

2,672,915

UNITED STATES PATENT OFFICE 2,672,915

SPRING SUPPORTED PEDESTAL TRACTOR SEAT

William P. Jones, Alamosa, Colo.

Application March 24, 1952, Serial No. 278,166

4 Claims. (Cl. 155—14)

This invention relates to a seat for a tractor or the like and has for its primary object to support the operator in a position in which the controls of the tractor may be readily reached.

Another object is to support the operator at a height above the tractor so that his vision is not impaired by protruding parts of the tractor.

A still further object of the invention is to so cushion the seat as to avoid the transmission of shocks and bumps to the operator, and thus contribute to his comfort and avoid fatigue.

The above and other objects may be attained by employing this invention which embodies a seat for substitution in place of the seat cushions of a conventional tractor which comprises an elongated frame carried by the fuel tank of the tractor, a column carried by the frame for adjustment longitudinally thereof, said column extending upwardly from the frame and a bucket seat swivelly carried by the upper end of the column.

Other features include means for adjusting the position of the frame on the fuel tank to enable the tractor to be comfortably driven by either a short or a tall man.

Still other features include a base plate mounted on the frame for longitudinal adjustment relative thereto, a tubular column carried by the base plate and extending upwardly therefrom, a sleeve mounted within the tubular column and extending upwardly beyond the upper end thereof, a flange carried by the sleeve on the exterior of the column, a compression coil spring surrounding the column and bearing on the base plate and on the flange, and a post telescopically entered into the upper end of the sleeve having a bucket seat swivelly connected to its upper end and means for adjusting the height of the seat above the flange.

Figure 2:
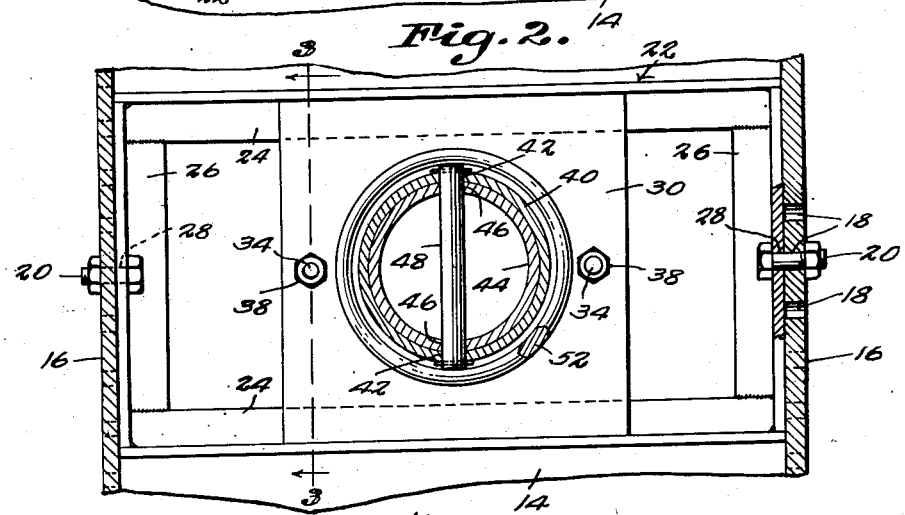
Figure 3:

In the drawings,

Fig. 1 is an enlarged sectional view through a frame and column embodying the features of this invention, showing a conventional bucket seat swivelly coupled to the upper end of the column, the seat being rotated to a position longitudinally of the frame, Fig. 2 is a horizontal sectional view taken substantially along the line 2—2 of Fig. 1, Fig. 3 is a transverse sectional view taken substantially along the line 3—3 of Fig. 2, Fig. 4 is a front view of a conventional L-shaped tractor fuel tank showing the seat mounted thereon and rotated to a position transversely of the frame, certain portions being shown in section more clearly to illustrate certain details of construction, Fig. 5 is a horizontal sectional view taken substantially along the line 5—5 of Fig. 4, and Fig. 6 is a transverse sectional view taken substantially along the line 6—6 of Fig. 4, showing portions of the seat and column in section.

Referring to the drawings in detail a tractor of conventional type (not shown) is equipped with a conventional substantially transversely L-shaped fuel tank designated generally 10 which comprises a vertical leg 12 and a horizontal leg 14. Such a fuel tank provides a convenient support for conventional seat and back cushions (not shown) which are conveniently placed respectively on the horizontal leg 14 and vertical leg 12 between end plates 16 which under ordinary circumstances form arm rests for the occupants of the seat. The structure just described is conventional with many types of tractors and the tank 10 is located in such a position on the tractor that the control levers and pedals of the tractor are within reach of the occupant of the seat. Owing to the fact however that no adjustment of the seat and back cushions relative to the operating control mechanism of the tractor is provided, operators of different heights have been compelled to either stretch to reach the tractor control mechanism, or have been cramped because the seat was placed too close to the control mechanism.

To overcome this difficulty the end plates 16 are each provided with a horizontal row of horizontally spaced openings 18 with the openings of one plate aligning with those of the other for the reception of attaching bolts 20 by means of which an elongated rectangular supporting frame designated generally 22 may be detachably coupled to the tank 10. The frame 22 comprises spaced parallel elongated side bars 24 preferably formed of angle iron, the horizontal legs of which extend inwardly relative to the frame and form supports for the adjustable seat to be more fully hereinafter described. The end bars 26 of the frame 22 extend transversely of the frame adjacent opposite ends of the side bars 24 and are provided intermediate their ends with aligning openings 28 which are adapted to be aligned with aligned openings 18 to receive the attaching bolts 20. Like the side bars 24, the end bars 26 are formed of angle bars and the horizontal legs of the angle bars of the end bars 26 are disposed inwardly relative to the frame with their ends welded or otherwise rigidly secured to the side bars 24.

Mounted for transverse sliding movement on the horizontal legs of the side bars 24 of the frame 22 is a base plate 30 which is provided adjacent opposite ends with openings 32 for the reception of screw threaded studs 34 carried by a clamp plate 36 which extends across the underside of the base plate 30 to engage the undersides of the horizontal legs 24 so that when nuts 38 are threaded onto the studs 34 and drawn tightly, the clamp plate will firmly clamp the base plate 30 in the desired position on the frame 22. Carried by and extending upwardly from the base plate 30 is a tubular column 40, and formed in this column adjacent its lower end are diametrically opposed elongated longitudinal slots 42, the purpose of which will hereinafter appear.

Entering the upper end of the tubular column 40 is a sleeve 44 which is provided adjacent its lower end with diametrically opposed openings 46 for the reception of a stop pin 48 which extends through the slots 42 and limits relative movement between the sleeve 44 and column 40. Carried by the sleeve 44 at the upper end thereof is an outstanding flange 50, and surrounding the column 40 and bearing at one end on the base plate 30 and at its opposite end on the flange 50 is a compression coil spring 52 which exerts yielding pressure on the flange 50 to yieldingly hold the sleeve upwardly within the column as will be readily understood upon reference to Fig. 1.

Entering the upper end of the sleeve 44 is a post 54 which is provided with longitudinally spaced openings 56 for the reception of a transversely extending stop pin 58, opposite ends of which project beyond the post and engage the flange 50 to limit the distance that the post may enter the sleeve, and thus provide height adjustment for the seat that is carried by the post. Swively mounted as at 60 to the upper end of the post for rotation about the vertical axis thereof is a conventional bucket seat 62.

In use, where the device is to be mounted on a conventional L-shaped fuel tank 10, the usual seat cushions are removed therefrom, and the frame 22 is secured in place thereon by passing the bolts 20 through aligned openings 18 and 28 in the arm rests 16 and the frame 22 respectively. With the frame thus secured in place, and the clamp plate 36 located beneath the frame, the base plate 30 is placed on the frame substantially as illustrated in the drawings within the studs 34 passing through the openings 32 and the nuts 38 threaded onto the studs. The base plate and seat assembly may be adjusted transversely on the frame 22 to the desired position and the nuts 38 tightened to securely clamp the base plate in place. The user may then adjust the height of the seat by extracting the stop pin 58 and passing it through a selected opening in the post 54. Upon occupying the seat the user may conveniently turn to the right or left by reason of the swivel connection 60 of seat 62 to the post 54 and by reason of the vertical adjustability of the seat, its height may be regulated to accommodate persons of different heights. Owing to the fact that the seat is supported on the spring 52, it will be evident that many of the shocks encountered by the tractor will be cushioned by the spring and will not be transmitted to the occupant of the seat.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A seat for a tractor or the like comprising a base adapted to be mounted on a tractor or the like, an elongated tubular column carried by the base and extending upwardly therefrom, an elongated sleeve extending into the column through the end thereof remote from the base, an outstanding annular flange carried by the sleeve adjacent the upper end thereof, yielding means extending adjacent the column and engaging the base and the flange for urging the sleeve upwardly within the column, an elongated post extending into the sleeve through the upper end thereof, means extending through the post for limiting downward movement of the post relative to the sleeve, and a seat carried by the post.

2. A seat for a tractor or the like comprising a base adapted to be mounted on a tractor or the like, an elongated tubular column carried by the base and extending upwardly therefrom, an elongated sleeve extending into the column through the end thereof remote from the base, an outstanding annular flange carried by the sleeve adjacent the upper end thereof, yielding means extending adjacent the column and engaging the base and the flange for urging the sleeve upwardly within the column, means extending through the column and through the sleeve for limiting the movements of the sleeve relative to the column, an elongated post extending into the sleeve through the upper end thereof, means extending through the post for limiting downward movement of the post relative to the sleeve and a seat carried by the upper end of the post.

3. A seat for a tractor or the like comprising a base adapted to be mounted on a tractor or the like, an elongated tubular column carried by the base and extending upwardly therefrom, an elongated sleeve extending into the column through the end thereof remote from the base, an outstanding annular flange carried by the sleeve adjacent the upper end thereof, yielding means extending adjacent the column and engaging the base and the flange for urging the sleeve upwardly within the column, means extending through the column and through the sleeve for limiting the movements of the sleeve relative to the column, an elongated post extending into the sleeve through the upper end thereof, said post having a longitudinal row of longitudinally spaced openings extending transversely therethrough, a stop extending through a selected opening in the post and projecting beyond opposite sides thereof for engaging the flange and limiting downward movement of the post relative to the sleeve, and a seat swivelly carried by the post at the upper end thereof.

4. A seat for a tractor or the like comprising an elongated frame adapted to be mounted on a tractor or the like, a base carried by the frame for adjustment transversely thereof, an elongated tubular column mounted on the base and extending upwardly therefrom, an elongated sleeve extending into the column through the upper end thereof, an outstanding flange carried by the sleeve above the column, a compression coiled spring surrounding the column and bearing on the base and on the flange, said column being provided with longitudinal slots adjacent the lower end thereof, a pin extending through said slots in the column and through the sleeve for limiting the movements of the sleeve relative to the column, an elongated post extending into the sleeve through the upper end thereof, said post having a longitudinal row of longitudinally spaced openings extending transversely therethrough, a stop pin extending through an opening in the longitudinal row of openings and projecting beyond opposite sides of the post for engaging the flange on the sleeve and limiting downward movement of the post relative to the sleeve, and a bucket seat swivelly connected to the post at the upper end thereof.

WILLIAM P. JONES.

References Cited in the file of this patent

UNITED STATES PATENTS

| Number | Name | Date |
|---|---|---|
| 1,488,024 | Nichols | Mar. 25, 1924 |
| 1,583,030 | Thompson | May 4, 1926 |
| 1,726,372 | Stoll | Aug. 27, 1929 |
| 2,516,801 | Renaud | July 25, 1950 |
| 2,604,925 | Swift | July 29, 1952 |